March 23, 1971     A. G. MOORE     3,572,101

FIRMNESS TESTING APPARATUS

Filed Sept. 24, 1969     4 Sheets-Sheet 1

Inventor
Arnold G. Moore
BY Pendleton, Neuman,
Seibold & Williams
Attorneys

March 23, 1971  A. G. MOORE  3,572,101
FIRMNESS TESTING APPARATUS
Filed Sept. 24, 1969  4 Sheets-Sheet 2
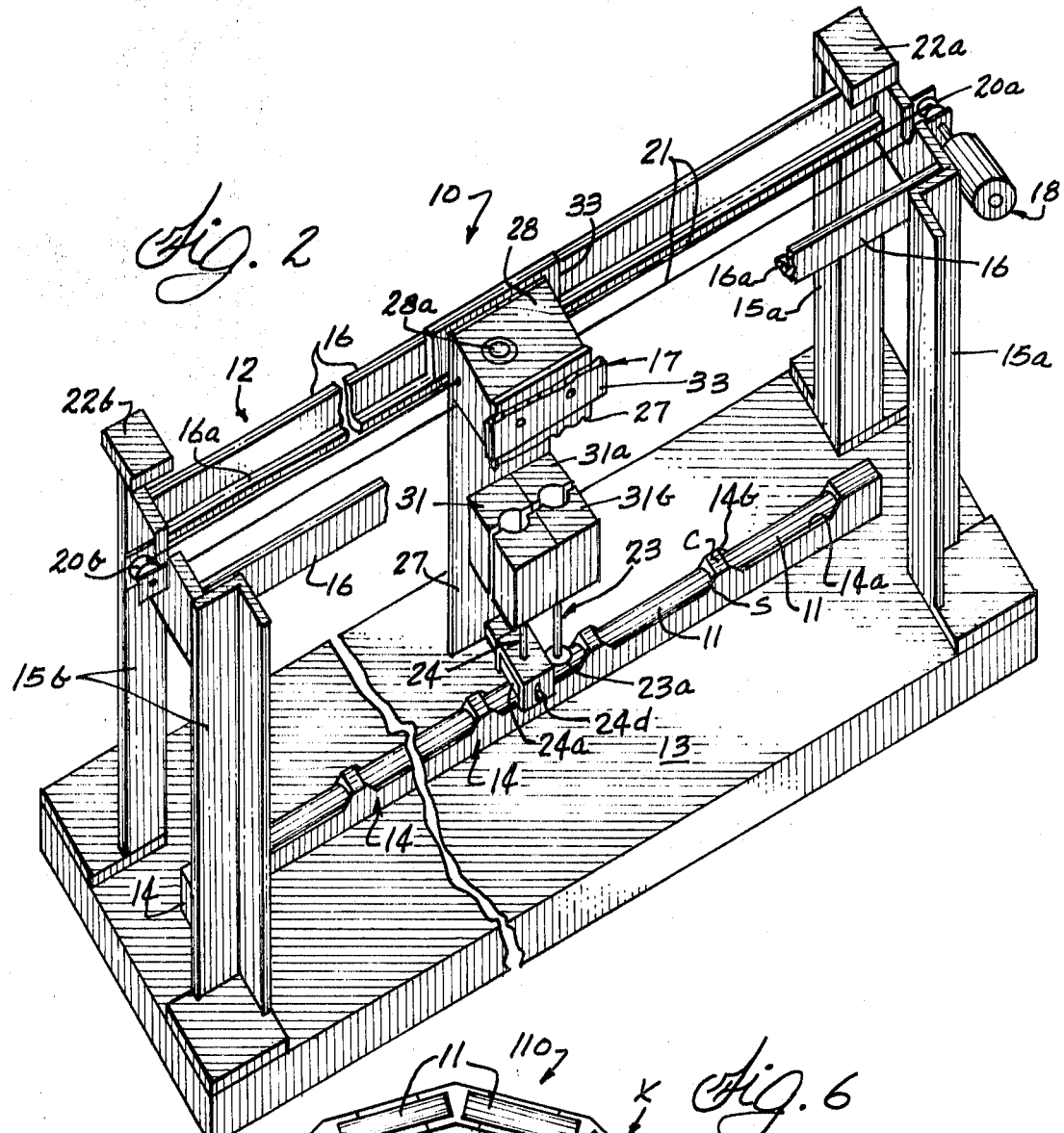
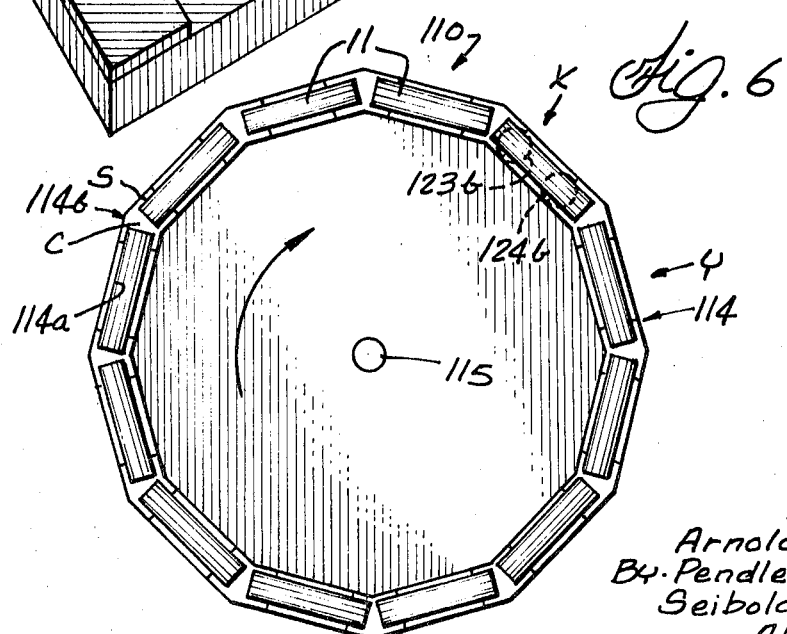
Inventor
Arnold G. Moore
By Pendleton, Neuman,
Seibold & Williams
Attorneys

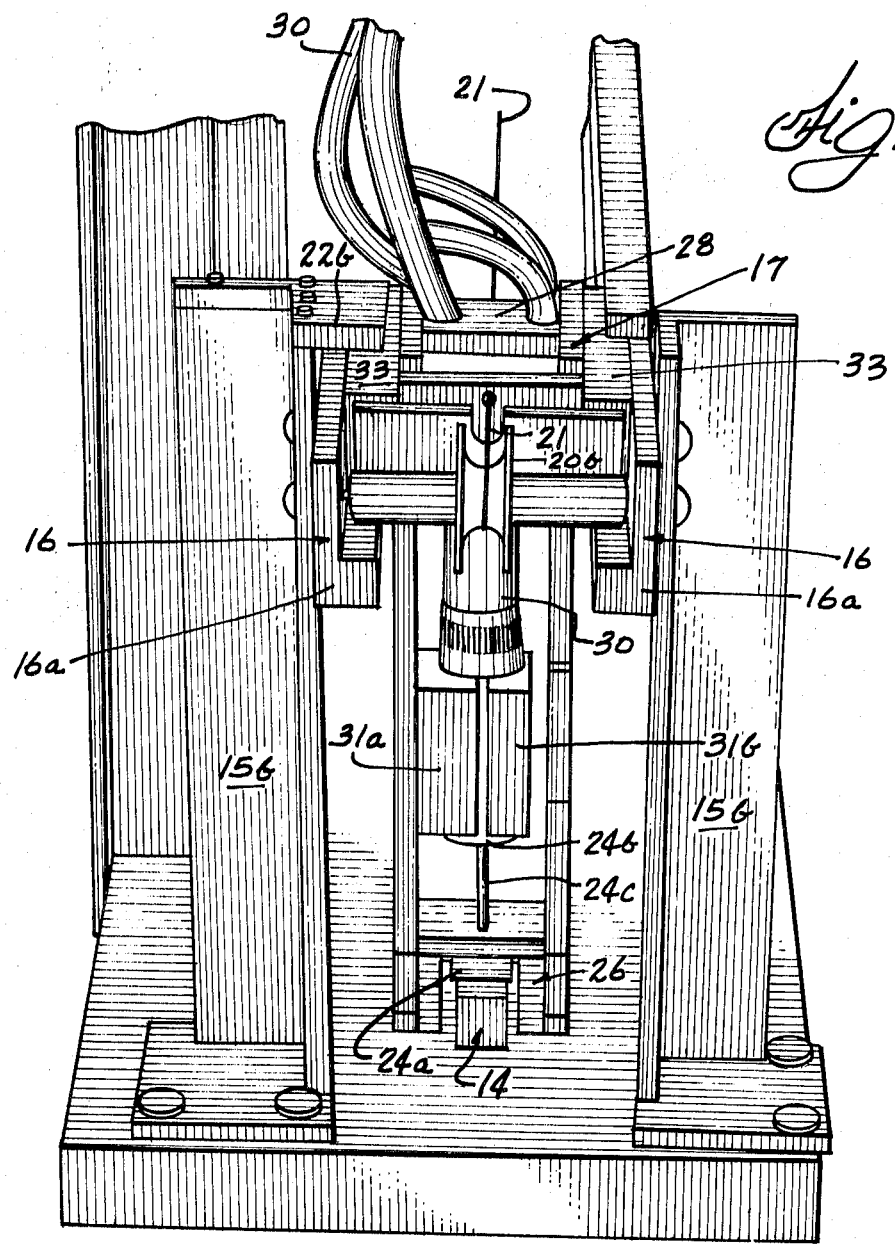

Inventor
Arnold G. Moore
By Pendleton, Neuman,
Seibold & Williams
Attorneys

United States Patent Office 3,572,101
Patented Mar. 23, 1971

3,572,101
FIRMNESS TESTING APPARATUS
Arnold G. Moore, Winston-Salem, N.C., assignor to R. J. Reynolds Tobacco Company, Winston-Salem, N.C.
Filed Sept. 24, 1969, Ser. No. 860,533
Int. Cl. G01n 3/42
U.S. Cl. 73—81                                   11 Claims

ABSTRACT OF THE DISCLOSURE

A testing apparatus is provided for use in testing the firmness of a tobacco rod or the like. The apparatus includes a frame for accommodating a rod to be tested, and a pair of sensing elements adjustably mounted on a carrier, the latter being movable relative to the frame so as to traverse the length of the accommodated rod. Each sensing element is adjustable and has an end thereof in contact with the periphery of the accommodated rod and imparts a predetermined force on the rod exterior. There is a predetermined differential in the force imparted on the rod exteriorly by said sensing elements. Electrical means are provided which are operatively connected to said sensing elements and measure the relative deflection of said sensing elements as they traverse the rod length.

BACKGROUND OF THE INVENTION

Heretofore various firmness or compactness testing apparatus have been provided which, however, because of certain design characteristics were beset with one or more of the following shortcomings: (a) the operation thereof involved substantial manual effort which rendered same susceptible to human error; (b) the operation thereof was slow and the test results often difficult to interpret causing a substantial time delay to occur before any correction in the cigarette production procedure could be made and thus, a substantial number of cigarettes of substandard quality would be produced; and (c) the apparatus was of bulky, complex, and costly construction and required an inordinate amount of maintenance.

SUMMARY OF THE INVENTION

Thus, it is an object of this invention to provide an apparatus which avoids the aforenoted shortcomings associated with various prior structures.

It is a further object of this invention to provide a testing apparatus which is capable of accommodating at one time a plurality of tobacco rods.

Further and additional objects will appear from the description, accompanying drawings, and appended claims.

In accordance with one embodiment of this invention a cigarette firmness testing apparatus is provided which includes a frame for accommodating in a horizontal end-to-end relation a plurality of tobacco rods. Mounted on the frame for reciprocatory horizontal movement with respect thereto is a carrier. The carrier is provided with a pair of vertically adjustable sensing elements, the lower ends of which engage the periphery of the accommodated rods and are caused to traverse same. There is a predetermined weight differential between the sensing elements. Electrical means are provided which are operatively connected to the sensing elements and are responsive to the relative deflection between the sensing elements as they traverse the rods.

DESCRIPTION

For a more complete understanding of the invention reference should be made to the drawings wherein:

FIG. 2 is a fragmentary, perspective top view of the apparatus shown in FIG. 1.

FIG. 3 is an enlarged, fragmentary, perspective left end view of the apparatus of FIG. 1.

FIG. 6 is a fragmentary top view of a modified form of the improved apparatus.

Figure 1:
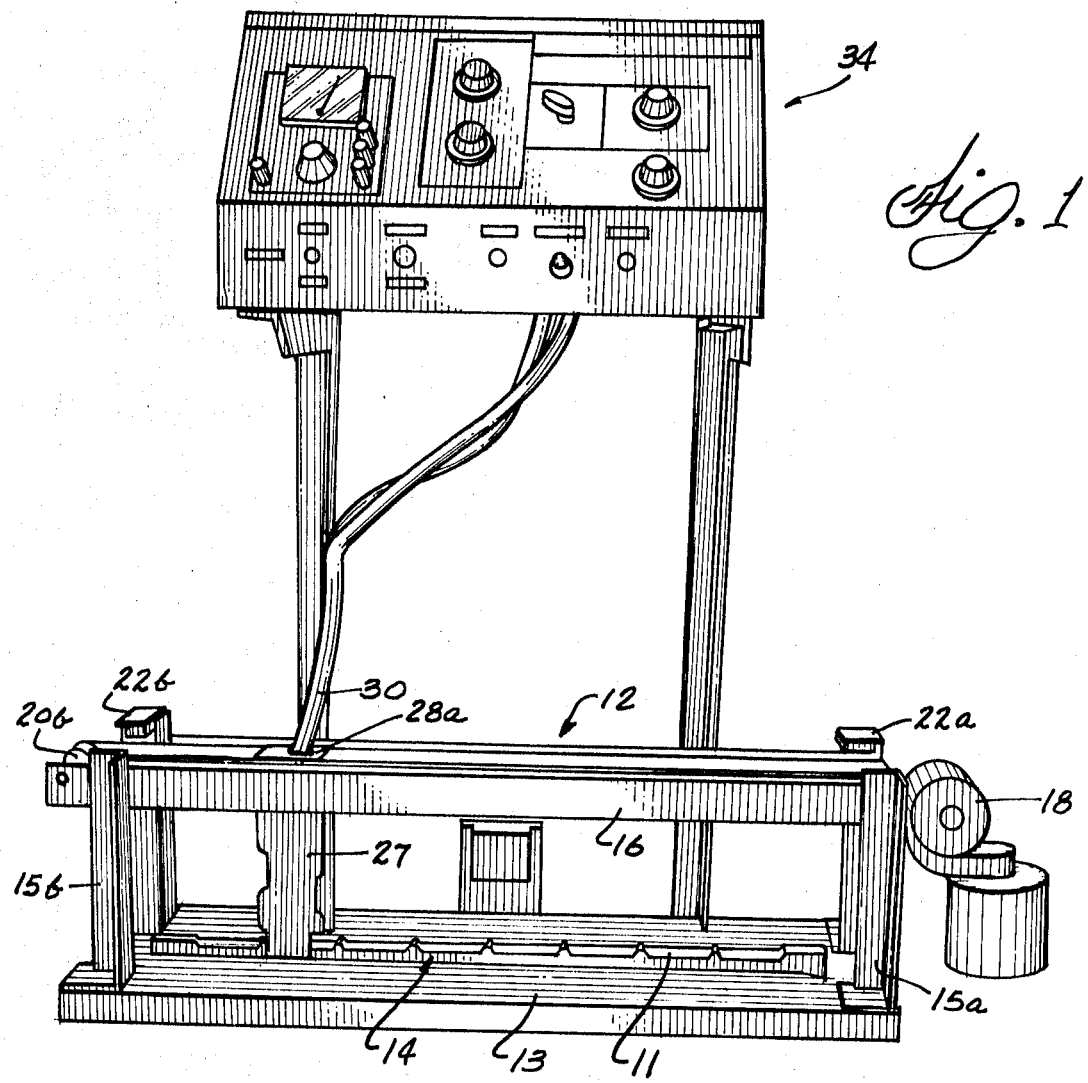
FIG. 1 is a fragmentary, perspective front view of one form of the improved apparatus.

Referring now to the drawings and more particularly to FIGS. 1 and 2, one form of the improved apparatus 10 is shown which is adapted to test the firmness of a tobacco rod 11. The apparatus includes an elongated frame 12 having a bottom section 13 on which is horizontally mounted an elongated rectilinear tobacco rod holder 14. Extending upwardly from the bottom section and positioned at opposite ends of the holder are pairs of upright frame supports 15a and b. Disposed above holder 14 and in parallel relation therewith are elongated, spaced, parallel track members 16 which span the distance between the pairs of supports 15a and b.

Mounted for linear reciprocatory movement in the frame track members 16 is a carrier 17. Movement of the carrier 17 is obtained from an electric motor 18, a pair of pulleys 20a and b, and a cord 21. The end limits of the carrier movement along the track members are determined by a pair of switches 22a and b which are mounted on the supports 15a and b, and are disposed within the path of movement of the carrier.

Mounted on the carrier 17 and vertically adjustable with respect thereto are a pair of sensing elements 23 and 24. Element 23 is adapted to establish a reference plane. Element 24, on the other hand, has greater weight than element 23 and penetrates or depresses portions of the rod exterior. Where the compactness of the tobacco rod throughout, or where only a portion thereof, is inadequate, element 24 will depress the rod exterior to a greater degree in such areas and said element 24 will be deflected to a greater extent with respect to element 23. The contact between element 23 and the rod exterior is very light and thus no discernible depression on the rod exterior is produced by element 23. Both sensing elements depend from the carrier and have the lower ends 23a and 24a thereof simultaneously in contact with the periphery of each accommodated rod 11 as the carrier traverses the length thereof. In testing the rod compactness, the reference element 23 is disposed in a lead position with respect to element 24 during traversing the rod length. In the illustrated embodiment, measurements are taken only while the carrier 17 is moving from left to right in FIG. 2.

Figure 4:
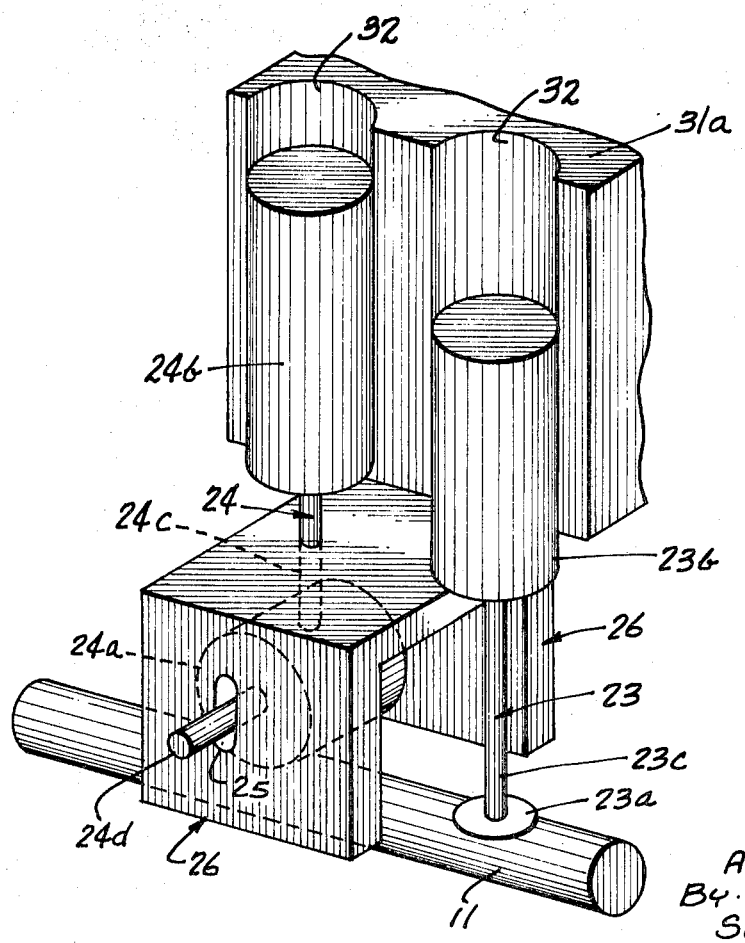
FIG. 4 is a fragmentary, diagrammatic, perspective view of the carrier.

Each of the sensing elements 23 and 24, as seen in FIG. 4, includes a coil member 23b or 24b, the axis of which is vertically disposed, and a core piece slidably mounted within the coil member 23b or 24b. Each core piece has a depending rod 23c or 24c. The lower end of rod 23c terminates in a horizontally disposed disc-shaped element 23a which lightly rests upon the periphery of the tobacco rod 11. The core piece, rod 23c, and disc-shaped element 23a are formed of light-weight material and thus, accounts for the lightness of contact between the disc-shaped element and the periphery of the tobacco rod. Because of the curvature of the tobacco rod, the contact between 23a and the periphery of rod 11 is substantially a straight line.

Sensing element 24, on the other hand, has the depending rod 24c of the core piece terminating in a cylindrically-shaped member 24a, the axis of which is perpendicular to the axis of the depending rod 24c and the axis of the tobacco rod 11 being tested, see FIG. 4. The cylindrically-shaped member 24a has a predetermined weight and will be responsive by way of vertical deflection to variations in the firmness or compactness of the tobacco rod as said element traverses the length thereof. The contact between the element 23a and the exterior of the tobacco rod establishes a reference plane or base for measuring the extent of vertical deflection of the member 24a.

Because of the cylindrical configuration of member 24a and the relative disposition thereof with respect to the tobacco rod 11 a substantially point contact is established. To maintain the cylindrical member 24a in proper relation with respect to the axis of rod 11, the ends of member 24a are provided with axially projecting pins 24d which extend through vertically disposed slots 25 formed in an inverted substantially U-shaped guide 26. The guide 26 is fixedly secured to vertically extending, spaced, parallel end plates 27. The upper end portions of the plates 27 are held in proper relative position by a spacer block 28. The block is provided with one, or more, openings 28a through which extend electrical leads 30, see FIG. 1. The function of the leads will be discussed more fully hereinafter.

Disposed beneath block 28 and secured to plates 27 is a clamp unit 31, which includes a pair of complementary sections 31a and b coacting with one another to clamp therebetween the coil members 23b and 24b of the sensing elements 23 and 24, see FIGS. 2 and 4. Each clamp section is provided with an elongated vertically disposed half pocket 32 which partially conforms to the exterior configuration of the coil members 23b and 24b. The half pockets 32 permit the coil members to be adjusted to the desired vertical position depending upon the diameter of the tobacco rods 11 to be tested.

Affixed to the exterior of the upper portions of the plates 27 are laterally extending runners 33 which slidably engage inwardly extending flanges 16a of the frame tracks 16. As aforementioned, movement of the carrier 17 along the flanges 16a is accomplished by a driven cord 21. The upper leg of the cord is fixedly secured to the spacer block 28 of the carrier 17. The cord 21 is disposed substantially equi-distant from the tracks 16 and the upper leg of the cord is substantially parallel to the tracks.

The tobacco rod holder 14, as seen in FIG. 2, is rectilinear and provided with a plurality of elongated axially aligned pockets 14a shaped to accommodate a corresponding number of tobacco rods 11. Adjacent pockets 14a are separated from one another by a partition 14b. Each partition has a plateau-like center portion C and depending divergent sides S. The center portion C and upper portions of the sides S are elevated with respect to the accommodated rod 11. Each partition 14b functions in the dual capacity of (a) providing an end limit for the pocket 14a; and (b) providing a means of effecting at predetermined stages of travel disengagement between the sensing elements and the tobacco rod. The inclination of the sides S is such that disengagement occurs at approximately 16 millimeters from each end of the accommodated tobacco rod 11. The reason for effecting the sensing element disengagement at such a distance from the ends of the rod is that the firmness or compactness of the tobacco core adjacent the ends is non-uniform and not typical of the remainder of the rod.

Mounted on frame 12 and spaced above tracks 16 is an instrument console 34, which may house the various electrical components utilized in measuring and interpreting the inductance produced by the vertical deflections of the sensing element core pieces relative to the respective members 23b and 24b. The electrical components in question are shown schematically in FIG. 5 wherein it will be noted that each coil member 23b or 24b is connected by leads 30 to a corresponding D.C./A.C. converter-signal rectifier 35. The output from each converter-rectifier 35 is transmitted by leads 36 to a balancing-calibrating-summing junction unit 37. Power to the junction unit 37 is supplied by a suitable D.C. source 38. The output from junction unit 37 is transmitted by lead 40 to a suitable device 41 (e.g. a computer, and/or digital readout, and/or analog recorder, etc.). As aforementioned, these components may be mounted within the console 34. In instances however where they are mounted outside the console suitable jacks, not shown, may be provided for connecting said components to said console. The length of the leads 30 from the console 34 to the sensing elements 23 and 24 is such as to enable the carrier 17 to move freely along the track member 16. The elevation of the console may be readily adjusted to accommodate the convenience of the person operating the apparatus. Suitable controls and gauges are mounted on the exposed front face of the console to regulate power input to the apparatus 10.

FIG. 6 discloses a modified form of testing apparatus 110 wherein the sensing elements 123 and 124 thereof remain at a fixed station X while a rod holder 114 rotates and causes the accommodated rods 11 to successively pass therebeneath. The holder 114 is annular in configuration and is mounted to rotate about a vertical axis 115. Subsequent to the accommodated rod having passed beneath the sensing elements, it is removed from the holder at station Y and a new rod replaces same. The removing and replacing of the rod at station Y may be done with automatic equipment if desired.

The holder 114 is provided with a plurality of rod accommodating pockets 114a which are separated from one another by raised partitions 114b. Each partition is similar in configuration and function to that of partition 14 previously described; that is to say, partition 114 includes a raised plateau-like center portion C and depending divergent sides S. In lieu of the holder 114 being annular in configuration, the individual pockets could be arranged in end-to-end relation on an endless belt whereupon as the belt moves in a given direction successive pockets will move past the sensing elements. Loading of the pockets whichever form the improved apparatus takes, can be accomplished manually or mechanically. The apparatus, if desired, can be located adjacent the discharge end of the cigarette-making machine.

Figure 5:
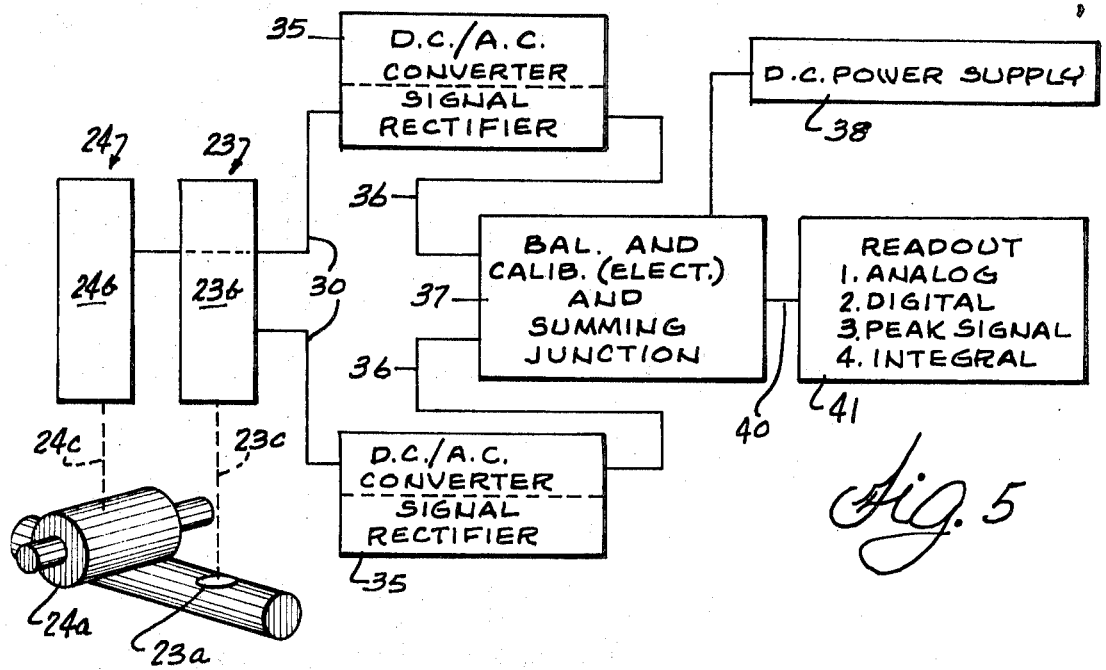
FIG. 5 is a schematic diagram of the electrical deflection-measuring means embodied in the improved apparatus.

The number and arrangement of the pockets in the holder and the configuration of the holder itself may be varied from that shown in the drawings. Furthermore, the number of sensing elements mounted on the carrier may be increased so as to increase the number of rods to be tested in a given period of time.

Where instantaneous notification of any defect in the tested rod is to be given to manufacturing personnel, the output from the unit 41, see FIG. 5, be it located adjacent to or remote from the cigarette-manufacturing machine may be transmitted directly to the person in charge. In instances where the correction or adjustment of the manufacturing equipment can be accomplished automatically and without shut-down of the equipment, the output from unit 41 can be fed directly into the machine itself thereby substantially reducing the amount of substandard cigarettes produced.

Thus, it will be seen that an improved testing apparatus has been provided which minimizes the susceptibility of the tests to human error. The apparatus is simple to operate and adjust, and its operation may be made compatible with existing cigarette-manufacturing techniques.

I claim:

1. An apparatus for use in testing the firmness of a tobacco rod, said apparatus comprising means for supporting the rod in a predetermined position, an adjustable first sensing means for lightly contacting the exterior of the supported rod and establishing a plane of reference, an adjustable second sensing means spaced from said first sensing means and adapted to contact the exterior of the supported rod, said second sensing means imparting a predetermined greater force on the rod exterior than said first sensing means, means for effecting traversing of the supported rod by said first and second sensing means, said second sensing means being responsive by way of deflection to variations in the firmness of the tobacco rod as the length thereof is traversed by both of said sensing means, and electrical means operatively connected to said first and second sensing means for measuring the deflection of said second sensing means relative to said plane of reference.

2. The apparatus of claim 1 wherein said rod-supporting means is stationary and said first and second sensing means move as a unit when traversing the supported rod, said first sensing means being disposed in a lead position with respect to said second sensing means when said deflection is being measured.

3. The apparatus of claim 1 wherein the rod-supporting means includes a horizontally-disposed holder having a plurality of elongated rod-accommodating pockets formed therein, said pockets being arranged in spaced end-to-end relation.

4. The apparatus of claim 3 wherein the holder pockets are arranged in rectilinear aligned relation.

5. The apparatus of claim 3 wherein the holder pockets are arranged so as to form a closed geometric figure.

6. The apparatus of claim 5 wherein said first and second sensing means remain in a fixed location and the holder pockets move successively past said location and beneath said sensing means.

7. The apparatus of claim 6 wherein the holder pockets form a circle, and said holder rotates about a vertical axis coincident with the center of curvatures of said circle.

8. The apparatus of claim 3 wherein adjacent holder pockets are separated from one another by an upwardly projecting partition, said partition having a raised plateau-type central portion and inclined side portions depending therefrom, said partition central and side portions being engageable by said sensing means, said sensing means when engaging said partitions being out of contact with the exterior of a rod accommodated within an adjacent pocket.

9. The apparatus of claim 1 wherein said first sensing means includes a vertically adjustable rod-like member having the lower end thereof terminating in a transversely disposed disc-shaped member, the latter having the underside thereof adapted to engage the exterior of a supported rod; and said second sensing means includes a vertically adjustable rod-like member having the lower end thereof terminating in a transversely disposed cylindrical member, the longitudinal axis of said cylindrical member being substantially normal to the longitudinal axis of the supported rod whereby substantially point contact is effected between said cylindrical member and the rod exterior.

10. The apparatus of claim 1 wherein each sensing means includes an inductance coil, and a vertical core piece adjustably disposed within said coil, and said electrical means includes a pair of D.C./A.C. converter-signal rectifiers, one being electrically connected to each inductance coil, a balancing-calibrating-summing junction unit electrically connected to receive the signal output from each converter-signal rectifier, and an electrical power source for said junction unit.

11. The apparatus of claim 10 including a console for housing said electrical means.

References Cited

UNITED STATES PATENTS

| | | | |
|---|---|---|---|
| 2,338,070 | 12/1943 | Lopez | 73—81 |
| 3,237,764 | 3/1966 | Kochalski et al. | 73—81X |
| 3,368,674 | 2/1968 | Koeppe | 73—81X |

FOREIGN PATENTS

| | | | |
|---|---|---|---|
| 285,255 | 9/1966 | Australia | 209—79 |

JAMES J. GILL, Primary Examiner

M. SMOLLAN, Assistant Examiner

U.S. Cl. X.R.

73—94

UNITED STATES PATENT OFFICE
CERTIFICATE OF CORRECTION

Patent No. 3,572,101              Dated March 23, 1971

Inventor(s) ARNOLD G. MOORE

It is certified that error appears in the above-identified patent and that said Letters Patent are hereby corrected as shown below:

Column 2, line 24   -   "in" should be --on--

Column 3, line 67   -   after "respective" insert --coil--

Column 5, line 31
      (Claim 7)   -   "curvatures" should be --curvature--

Signed and sealed this 20th day of July 1971.

(SEAL)
Attest:

EDWARD M. FLETCHER, JR.          WILLIAM E. SCHUYLER, JR
Attesting Officer                Commissioner of Patents